United States Patent [19]

Kramer

[11] 3,757,930

[45] Sept. 11, 1973

[54] CONVEYOR BELT SUSPENSION
[75] Inventor: James H. Kramer, Akron, Ohio
[73] Assignee: The B. F. Goodrich Company, New York, N.Y.
[22] Filed: May 18, 1970
[21] Appl. No.: 38,203

[52] U.S. Cl.................................. 198/192, 193/37
[51] Int. Cl............................................. B65g 15/08
[58] Field of Search................... 198/127, 192, 202; 29/115, 126; 193/35, 37; 267/154, 57.1 A

[56] References Cited
UNITED STATES PATENTS
3,327,838  6/1967  Jonker................................. 198/192
3,041,656  7/1962  Goodall..................... 267/57.1 A X
3,336,021  8/1967  Kramer.............................. 267/154

Primary Examiner—Richard E. Aegerter
Assistant Examiner—H. S. Lane
Attorney—W. A. Shira, Jr. and Harold S. Meyer

[57] ABSTRACT

A resilient idler suspension for conveyor belts having suspension arms cantilevered in pairs axially spaced about a common pivot shaft with each of the arms attached to the pivot shaft by an intermediate elastomeric torsion spring such that rotation of the arms about the pivot shaft is resiliently resisted. Pairs of arms each have a conveyor idler roller rotatably mounted between the free ends of the arms. Three of the pivot shafts may be arranged in angular relationship in a common plane transversely of the conveyor belt so that the idlers support the belt in the form of a trough.

3 Claims, 4 Drawing Figures

Patented Sept. 11, 1973

INVENTOR.
JAMES H. KRAMER
BY W. A. Shira, Jr.
ATTY.

Patented Sept. 11, 1973
3,757,930
2 Sheets-Sheet 2
Fig. 3
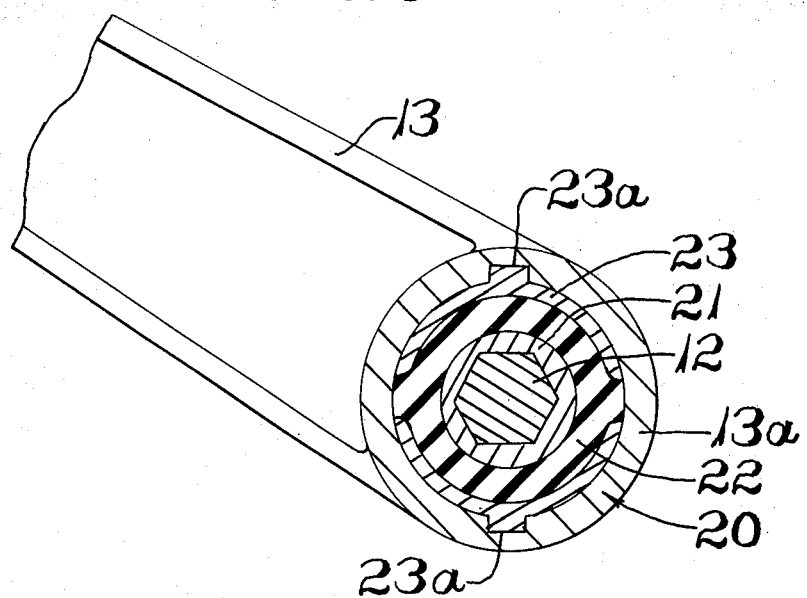
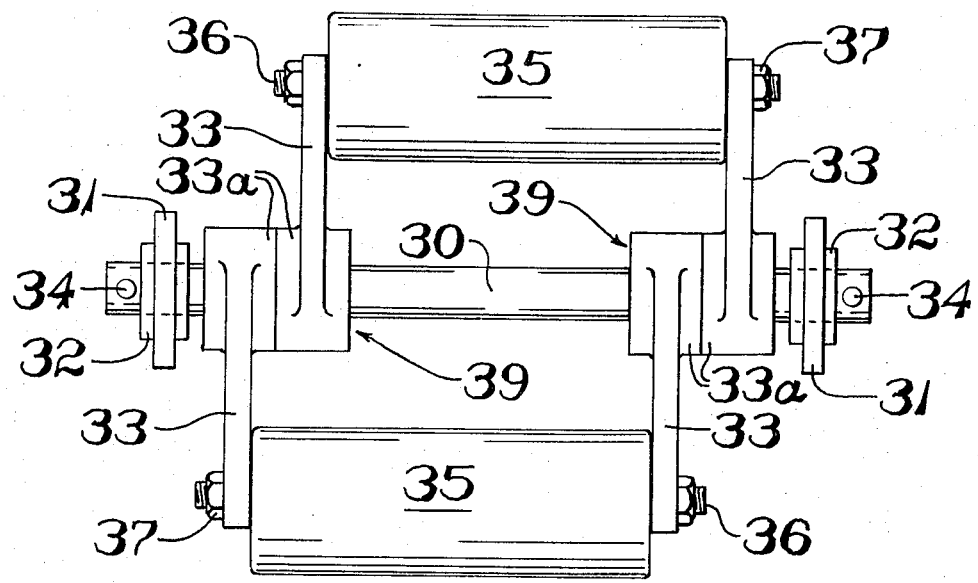
Fig. 4
INVENTOR.
JAMES H. KRAMER
BY
W. A. Shira, Jr.
ATTY.

CONVEYOR BELT SUSPENSION

BACKGROUND OF THE INVENTION

In conveyor belt applications, requiring multiple-location supporting of the conveyor along its load carrying length, it has long been desired to provide resiliency of the supports. In those applications where the conveyor belt is large with respect to its thickness and where heavy loads are dropped onto the conveyor, as for example crushed rock or granulated chemicals of high bulk density, it has been found difficult to maintain adequate load transport speed and load carrying capacity of the conveyor belt while undulating over the spaced, fixed-support rollers.

If the tension in the conveyor belt is increased in order to reduce the sagging of the belt between the roller supports, the cost of the conveyor belt is increased by virtue of the additional amount of reinforcement in the belt required to withstand the tension. Furthermore, as the belt is made thicker to accommodate the increased reinforcement, it becomes more difficult to provide power transmission for driving the belt and bending of the belt over head and tail pulleys. Alternatively, if the number of support rollers is increased, in order to reduce the sag of the conveyor between supports, the cost of the additional roller supports is often prohibitive.

In certain conveyor service applications as mentioned briefly above, the load is dropped into a transversely troughed conveyor from some height above the conveyor belt. In this type of service, particularly where the load has a high bulk density or hard irregular surfaces, the impact of the load on the moving conveyor belt tends to abraid or damage the surface of the belt when the belt is supported upon a rigid surface or upon rigid rollers mounted on an unyielding frame. When the force of the falling load is impacted upon the belt between supports that cannot yield, the belt sags between the nearest adjacent supports thus subjecting the belt to a sudden severe localized stretching which shortens the life of the belt. Furthermore, the high impulse elongations in the belt under the impact of the falling load particles, tends to provide longitudinal perturbations or vibrations thus rendering quite ifficult tracking and tensioning of the belt as well as smooth transmission of motive power thereto.

Alternatively, if a rigid support, for example a smooth slide shoe-plate, is provided under the belt in the region of falling load impact, damaging of the belt by the falling load particles is accentuated and often results in puncturing of the belt, particularly if large and jagged particles impact the belt as it passes over the rigid support plate. This is because all of the kinetic energy of the falling load particles must be substantially absorbed by the belt.

It has long been desirable, therefore, to provide a resilient suspension for conveyor belts and additionally, one which would be low in initial cost and require little or no maintenance. However, in some service applications, the dust and/or corrosive nature of the load particles render a conventional metal spring or mechanical pivot type suspension for the idler rollers impractical especially since it is necessary that the linkages and pivots of the suspension members be made to close tolerances and lubricated so that such suspensions for heavy service require costly maintenance.

SUMMARY OF THE PRESENT INVENTION

The present invention provides a solution to the above-described problems by providing an idler roller suspension for a conveyor belt having the rollers attached to pairs of arms extending cantilevered from a pivot shaft with each of the arms attached to the pivot shaft by an elastomeric torsion spring such that rotation of the arms, and thus movement of the idler rollers, about the pivot shaft is resiliently resisted by the elastomeric torsion springs. The rollers are disposed in pairs one each on opposite sides of the pivot shaft such that the arms are disposed in two rows with the row arcuately spaced in a "V" arrangement about the pivot shaft. Individual pivot shafts are arranged at spaced stations along the belt and a plurality of shafts may be aligned transversely of the belt such that the rollers are disposed so as to transversely trough the belt. Each roller is preferably independently suspended from the pivot shaft and deflection of one roller does not produce deflection of any of the other rollers. However, where it is desired to provide a dual roller suspension of the rollers in pairs, the pivot shaft in one embodiment of the invention is rotatably mounted at its ends on a support frame so that the rollers are free to rock in pairs about the pivot shaft. In this latter embodiment movement of each roller with respect to the other roller is resisted resiliently by the elastomeric torsion springs attaching each of the roller support arms to the shaft.

BRIEF DESCRIPTION OF THE DRAWINGS

FIG. 3 is a portion of a sectional view taken along section-indicating lines 3—3 of FIG. 1 and illustrates the details of the elastomeric torsion spring; and, FIG. 4 is a plan view of another embodiment of the invention having the pivot shaft rotatably mounted in the support brackets.

DETAILED DESCRIPTION

Figure 1:
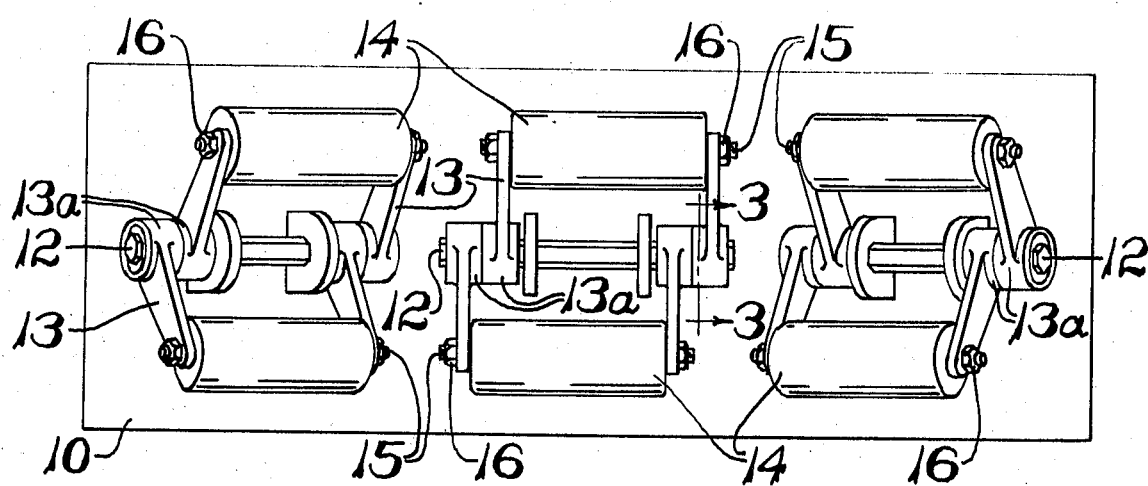
FIG. 1 is a plan view of the presently preferred embodiment of the invention incorporating a rigid mount for each of the pivot shafts.
Figure 2:
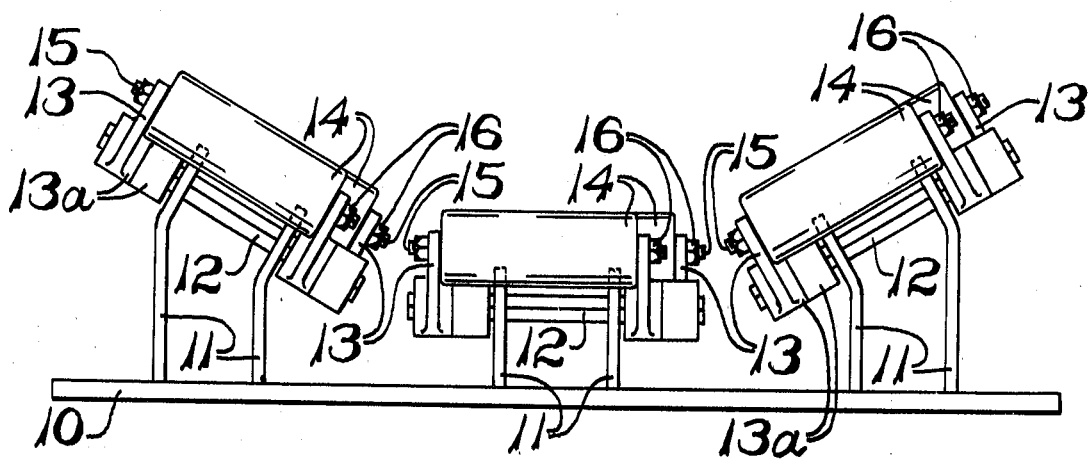
FIG. 2 is a side elevation view of the embodiment in FIG. 1.

Referring now to FIGS. 1 and 2, a conveyor belt idler suspension system is shown mounted on a support frame 10 by rigid support brackets 11, which brackets are in spaced pairs. A shaft 12 is attached to each pair of brackets for support and extends in spaced relationship from frame 10. In the preferred practice of the invention, three shafts 12 are provided at each longitudinal support station of the conveyor belt, with the shafts having their axes arranged transversely of the belt substantially at right angles thereto with the shafts in end-to-end spaced arrangement in a common plane transversely of the belt. Preferably, the center shaft is disposed horizontally with the shafts adjacent either end of the central one being inclined vertically to provide transverse troughing of the belt.

A plurality of suspension arms 13 is provided, each having a hollow hub portion 13a formed at one end, with the hub 13a received respectively over one of the shafts 12. An elastomeric spring means 20, see FIG. 3, is provided radially intermediate the respective shaft and each of the hubs 13a, with the inner periphery of the spring means engaging the shaft and the outer periphery of the spring means engaging, respectively, the bore of the hub 13a in each arm, such that rotation of the arms 13 about the shaft 12 is resiliently resisted by the elastomeric portion of the spring.

In the presently preferred practice of the invention, the arms 13 are disposed in pairs so as to extend from the associated shaft in spaced parallel relationship in two rows, with the rows extending from opposite sides of the shaft in diverging relationship. The pairs of arms thus extend from each of the shaft segments 12 in a V formation. An idler roller 14 is provided between the free ends of each pair of arms 13 such that each roller is parallel to the respective adjacent pivot shaft 12.

Each roller 14 has a shaft 15 passing centrally therethrough which shaft also is received through apertures provided in the free end of each of the adjacent arms 13 and the shaft 15 is retained thereon at each end by suitable means such as nuts 16 threaded over the ends of the shaft. Each of the rollers 14 is free to rotate about its shaft 15 and is resiliently suspended about the respective adjacent pivot shaft 12. Instead of the construction first described, the belt-engaging rollers may be rotatably suspended in pairs on opposite sides of a single arm 13 so as to extend cantilevered therefrom in generally a "T" arrangement.

Referring now to FIG. 3, the presently preferred form of elastomeric spring means 20 is illustrated as comprising an annular ring 22 of elastomer between two annular metal sleeves or shells. Each spring means is received concentrically over a shaft means 12. As here shown, each of the shafts has a polygonal transverse cross section and each spring means comprises an inner shell 21 intermediate the shaft 12 and the annular ring of elastomer 22. The sleeve 21 has a polygonal bore corresponding to the transverse cross sectional shape of the shaft 12 to prevent relative rotation therebetween. The bearing means 20 also includes a pair of cylindrical half-shells 23 on the outer periphery of the elastomeric ring 22 with the latter bonded to the inner shell 21 and outer half shells 23. The spring means 20 is preferably slightly compressed radially at assembly into the hub of the arm, with portions of the elastomeric ring being deformed so as to expand outwardly through the slots provided between the longitudinal edges of the half-shells.

Each of the half-shells 23 has a lug portion 23a extending from the outer periphery thereof which lugs 23a are received in corresponding recesses in the bore of the arm hub 13a thereby positively engaging thee spring means 20 with the arm hub 13a so as to prevent relative rotation therebetween. The preferred form of the elastomeric spring, as illustrated in FIG. 3, is substantially that disclosed in U.S. Pat. No. 3,336,021. However, it will be understood that other constructions of the elastomeric torsion spring may be used, as will be appparent to those having ordinary skill in the art.

In operation, as a conveyor belt, not shown, but which is supported upon the rollers 14 of the embodiment of FIGS. 1 – 3 is impacted by a falling load, or subject to a travelling load of varying size, the rollers 14 and their associated arms 13 in the area of the longitudinal station of impact or over which the variable size load is travelling are deflected about the pivot shaft 12 whichh deflection is resiliently resisted by the elastomeric spring means 20.

Referring now to FIG. 4, an alternative embodiment of the invention is illustrated wherein each shaft 30 is received in a pair of support brackets 31 disposed at the ends of the shaft with each end of the shaft rotatably mounted in a bearing 32 provided, respectively, in each of the support brackets the shaft is secured therein from axial removal by a pin 34 inserted through a cross-hole in each end of the shaft. A pair of arms 33, extending cantilevered in spaced, parallel relationship from the shaft 30 each have an idler roller 35 rotatably mounted so as to interconnect the free ends of the arms 33. The roller 35 is disposed parallel to the shaft 30 and is mounted over a central roller shaft 36 having each end thereof respectively received in a hole formed in the end of each of the arms 33. The roller shaft 36 is secured in the arms 33 by a nut 37 threaded over each end of the shaft 36. Preferably, two pairs of arms 33 are provided, the pairs being arranged arcuately spaced in diverging relationship about the pivot shaft 30, with a roller 35 provided between the ends of each pair of arms.

Each of the arms 33 has a hollow hub portion 33a received over the pivot shaft 30 with elastomeric spring means 39 provided radially intermediate the inner periphery of each of the hubs 33a and the shaft 30. The preferred elastomeric spring means 39 is similar to that described above with reference to the embodiment of FIG. 3; however, any other suitable type of elastomeric spring may be employed.

In operation, the pair of rollers 35 of the embodiment of FIG. 4 is contacted by a moving conveyor belt and as the belt is deflected by the force of impact of the falling load, the rollers 35 are deflected about the shaft 30 in a symmetric manner causing scissor-like rotation of the pairs of arms 33 with respect to each other. Rotation of the arms is resiliently resisted by the elastomeric spring means 39. The embodiment of FIG. 4 requires simultaneous deflection of a pair of rollers since the pivot shaft bearings 32 offer little resistance to rotation of the pivot shaft and thus the pair of rollers are brought into equal contact with the conveyor belt by rotation of the shaft 30 in bearings 32.

The present invention thus provides a resilient roller suspension for a conveyor belt with the rollers rotatably mounted on the ends of a pair of arms, which arms are attached by elastomeric torsion spring means so as to be deflected about a common pivot shaft with the deflection being resiliently resisted by the elastomeric torsion spring means.

Modifications and adaptations may be made by those having ordinary skill in the art, and the invention is limited only by the spirit and scope of the following claims.

I claim:

1. In combination, a conveyor belt to be supported and an idler suspension comprising:
   a. a support including a plurality of shaft means disposed in a common plane transversely of the belt in spaced end-to-end arrangement;
   b. at least two torsion spring means attached to each of said shaft means in a manner preventing relative rotation therebetween, each of said spring means including an annulus of elastomeric material as the yieldable portion;
   c. a plurality of arm means each having a portion attached to one of said torsion spring means in a manner preventing relative rotation therebetween, with each of said arm means extending radially in cantilever relationship therefrom;
   d. conveyor belt idler means mounted on each of said arm means for contacting the said conveyor belt, whereby variation in loads on said belt is resiliently resisted by the said respective torsion spring means.

2. The suspension system defined in claim 1, wherein each of said shaft means is disposed transversely of the conveyor belt in angular arrangement in a manner forming the conveyor belt into a trough, said arm means include at least two pairs of said arms with the arms of each pair extending radially from the shaft means to which it is attached in spaced parallel relationship and with the said pairs disposed in two arcuately spaced rows.

3. The suspension defined in claim 1, wherein
a. said arm means are disposed in two rows arcuately spaced about each of said shaft means with at least one pair of arms disposed in spaced parallel arrangement in each row; and,
b. said idler means is a roller having each end thereof rotatably mounted, respectively, on one of each pair of said arms and extending axially intermediate the arms of each pair of substantially parallel to the respective adjacent shaft means.

* * * * *